No. 671,487. Patented Apr. 9, 1901.
R. B. MARSHKE.
VARIABLE SPEED AND REVERSING MECHANISM FOR LATHES, PLANERS, &c.
(Application filed Nov. 1, 1900.)
(No Model.)
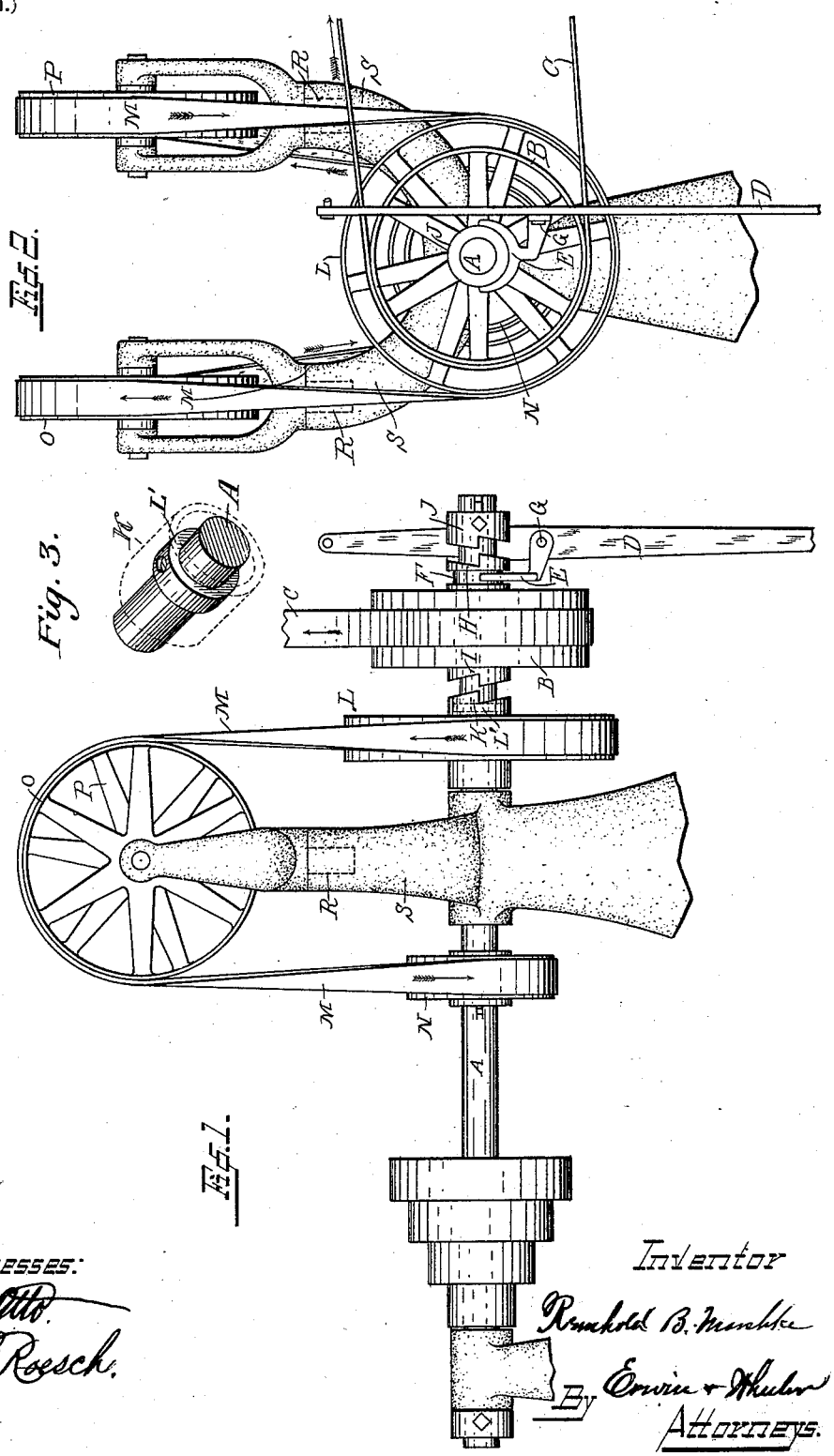

UNITED STATES PATENT OFFICE.

REINHOLD B. MARSHKE, OF CHAFFEE, NORTH DAKOTA.

VARIABLE-SPEED AND REVERSING MECHANISM FOR LATHES, PLANERS, &c.

SPECIFICATION forming part of Letters Patent No. 671,487, dated April 9, 1901.

Application filed November 1, 1900. Serial No. 35,077. (No model.)

*To all whom it may concern:*

Be it known that I, REINHOLD B. MARSHKE, a citizen of the United States, residing at Chaffee, in the county of Cass and State of North Dakota, have invented new and useful Improvements in Variable-Speed and Reversing Mechanism for Lathes, Planers, &c., of which the following is a specification.

The object of my invention is to provide a simple and efficient device for reversing the rotary movement of a driving-shaft and driving the same in opposite directions at different rates of speed.

The construction of my device is explained by reference to the accompanying drawings, in which—

Figure 1 represents a front view. Fig. 2 represents a side view drawn at right angles to that shown in Fig. 1. Fig. 3 is a detail, part in section, showing means for holding one of the pulleys in place on the driving-shaft.

Like parts are identified by the same reference-letters in all the views.

A is the main driving-shaft.

B is the pulley running loose on the shaft A and driven by the belt C in the direction indicated by the arrow and adapted to be moved toward the right and left on said shaft by the shifting lever D, which lever D is connected with said pulley B by the bifurcated arm E in the ordinary manner, the forks of which arm have loosely-fitting bearings in the recess F, formed in the hub of said pulley B. The opposite end of said arm E is connected with the lever D by a pivot G in the ordinary manner.

The pulley B is provided with a clutch H upon the right and a clutch I upon the left. The clutch H is adapted when said pulley is shifted toward the right to engage in the clutch J, which clutch J is rigidly secured to the shaft A, while the clutch I is adapted when said pulley is shifted toward the left to engage with the clutch K, which is rigidly connected with the pulley L. When the pulley B is in the position shown, (midway between the two clutches J and K,) it is free to rotate without driving the shaft A. When said pulley is shifted toward the right, the clutch H engages the clutch J, whereby the shaft A is driven, with said pulley B, in the same direction. When, however, the pulley is shifted toward the left, so that the clutch I engages the clutch K, motion is communicated through said clutches to the pulley L, whereby said pulleys B and L are driven together in the same direction, as indicated by the arrow, and whereby motion of the pulley L is communicated to the shaft A through the belt M and pulley N, thereby causing the shaft A to be driven in the opposite direction from the driving-pulley B. The fixed collar L' on the shaft A prevents the lateral movement of the pulley L.

It will be understood that the pulley N is rigidly keyed to the shaft A, while the pulley L, as well as the pulley B, is loose on said shaft. In thus communicating motion to the pulley N and shaft A the belt M passes upwardly (as indicated by the arrow) and over the idler O, down around the pulley N, passing from thence upwardly and over the rear idler P. Swivels R are provided in the supports S of the idlers O and P to permit such idlers to turn at an angle to the shaft A when the pulleys L and N are of different diameters. I have shown the pulley N smaller than the pulley L, whereby when motion is communicated to the shaft A through the pulley N said shaft A is caused to rotate in the reverse direction at a higher rate of speed than the driving-pulley in proportion to the respective sizes of the pulleys L and N. When, however, it is desirous to change the relative speed of the shaft to that of the driving-pulley, such end is accomplished by changing the relative sizes of the pulleys L and N to each other, whereby it is obvious that any desired speed of said driving-shaft may be procured in either direction from a uniform given speed of the pulley by changing the relative size of the pulleys L and N to each other.

While I have for convenience shown the idlers O and P supported in connection with the driving-shaft A, it is obvious that, if desired, said idlers may be supported independently of said shaft from the ceiling or otherwise.

While my device is not shown in connection with any special machinery, it is obvious that it is adapted to be used in connection with lathes, planers, and other machinery where it is desirous to reverse the movement and change the speed of such machinery.

Having thus described my invention, what I claim as new, and desire to secure by Letters Patent, is—

1. In a variable-speed and reversing mechanism for lathes, planers, &c., the combination of a driving-shaft; a loose driving-pulley slidably supported upon said shaft, provided upon its respective sides with clutches; means for shifting said driving-pulley longitudinally on said shaft; a clutch rigidly affixed to said driving-shaft upon one side of said driving-pulley, and adapted to be engaged by the opposing clutch on said pulley; a second pulley loosely supported from said shaft upon the opposite side of said driving-pulley, provided with a clutch adapted to be engaged by the opposing clutch of said driving-pulley; a third pulley, rigidly affixed to said shaft; two independently-revoluble pulleys or idlers located at an intermediate point at one side of said driving-shaft; and a belt communicating from said second pulley over one of said idlers to said third pulley, and from thence over the other of said idlers to said second pulley, whereby when said second pulley is revolved by the action of said driving-pulley, said third pulley is revolved in the opposite direction, together with its supporting-shaft, substantially as and for the purpose specified.

2. In a variable-speed and reversing mechanism for lathes, planers, &c., the combination of a driving-shaft; a loose driving-pulley slidably supported upon said shaft, provided upon its respective sides with clutches; means for shifting said driving-pulley longitudinally on said shaft; a clutch rigidly affixed to said driving-shaft upon one side of said driving-pulley, and adapted to be engaged by the opposing clutch on said pulley; a second pulley loosely supported from said shaft upon the opposite side of said driving-pulley, provided with a clutch adapted to be engaged by the opposing clutch of said driving-pulley; a third pulley of different diameter from said second pulley, rigidly affixed to said shaft; two independently-revoluble pulleys or idlers located at an intermediate point at one side of said driving-shaft; and a belt communicating from said second pulley over one of said idlers to said third pulley, and from thence over the other of said idlers to said second pulley, whereby when said second pulley is revolved by the action of said driving-pulley, said third pulley is revolved in the opposite direction, together with its supporting-shaft, at a different rate of speed, substantially as and for the purpose specified.

3. In a variable-speed and reversing mechanism for lathes, planers, &c., the combination of a driving-shaft A; a loose driving-pulley B slidably supported upon said shaft, provided upon its respective sides with clutches H and I; means for shifting said driving-pulley longitudinally on said shaft, consisting of the lever D and bifurcated arm E adapted to engage in the groove F of the pulley-hub B; a clutch I rigidly affixed to said driving-shaft upon one side of said driving-pulley and adapted to be engaged by the opposing clutch H of said pulley; a second pulley L loosely supported from said shaft upon the opposite side of said driving-pulley, provided with a clutch K, adapted to be engaged by the opposing clutch I of said driving-pulley; a third pulley N, of a different diameter, from said second pulley L, rigidly affixed to said shaft; two independently-revoluble pulleys or idlers O and P supported from said shaft A, located at an intermediate point at one side of said driving-shaft; and a belt M communicating from said second pulley L over one of said idlers O to said third pulley N, and from thence back over the other of said idlers P to said second pulley L, whereby when said second pulley is revolved by the action of said driving-pulley, said third pulley is revolved in the opposite direction together with its supporting-shaft, substantially as and for the purpose specified.

In testimony whereof I affix my signature in the presence of two witnesses.

REINHOLD B. MARSHKE.

Witnesses:
C. F. VAIL,
J. B. VAIL.